Figure 1:
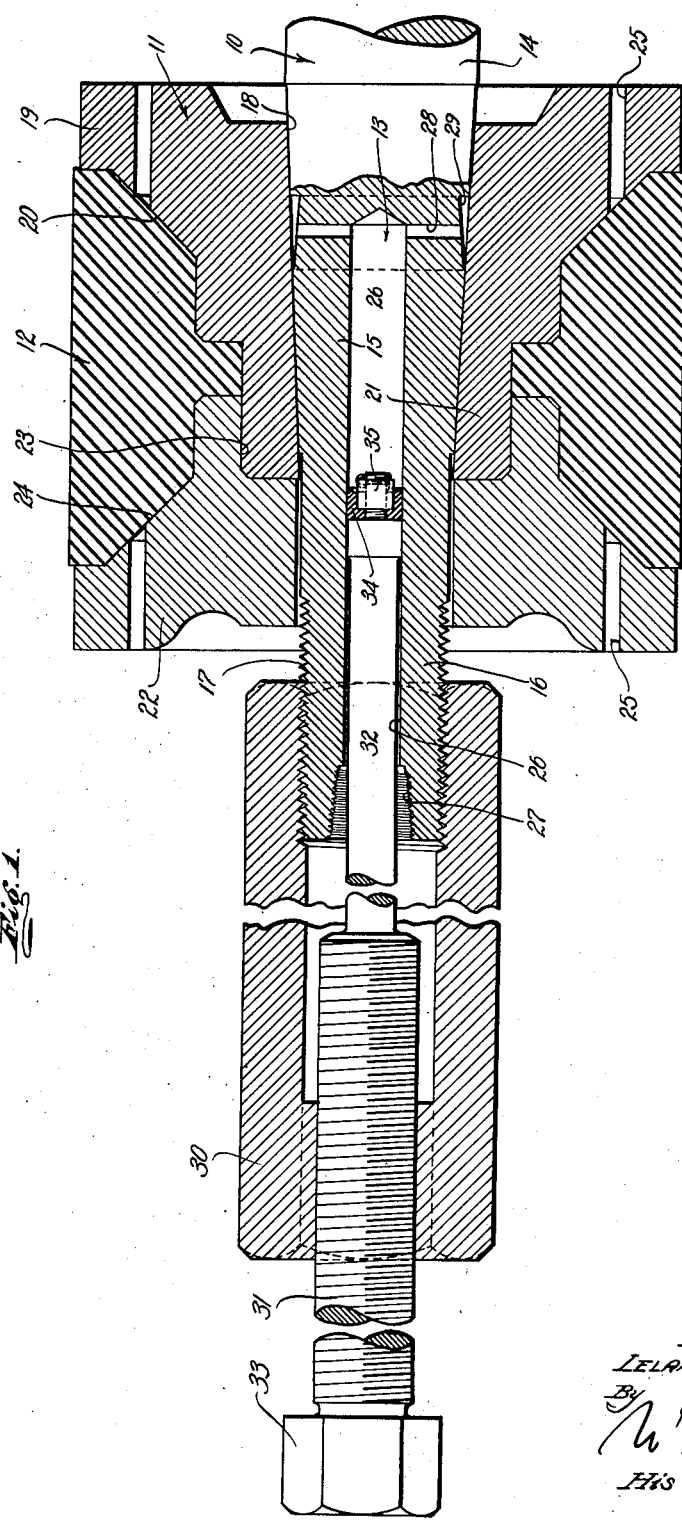

June 22, 1937.    L. S. HAMER    2,084,439
PISTON AND PISTON ROD ASSEMBLY
Filed March 10, 1934    2 Sheets-Sheet 1

Inventor
LELAND S. HAMER
By
His Attorney

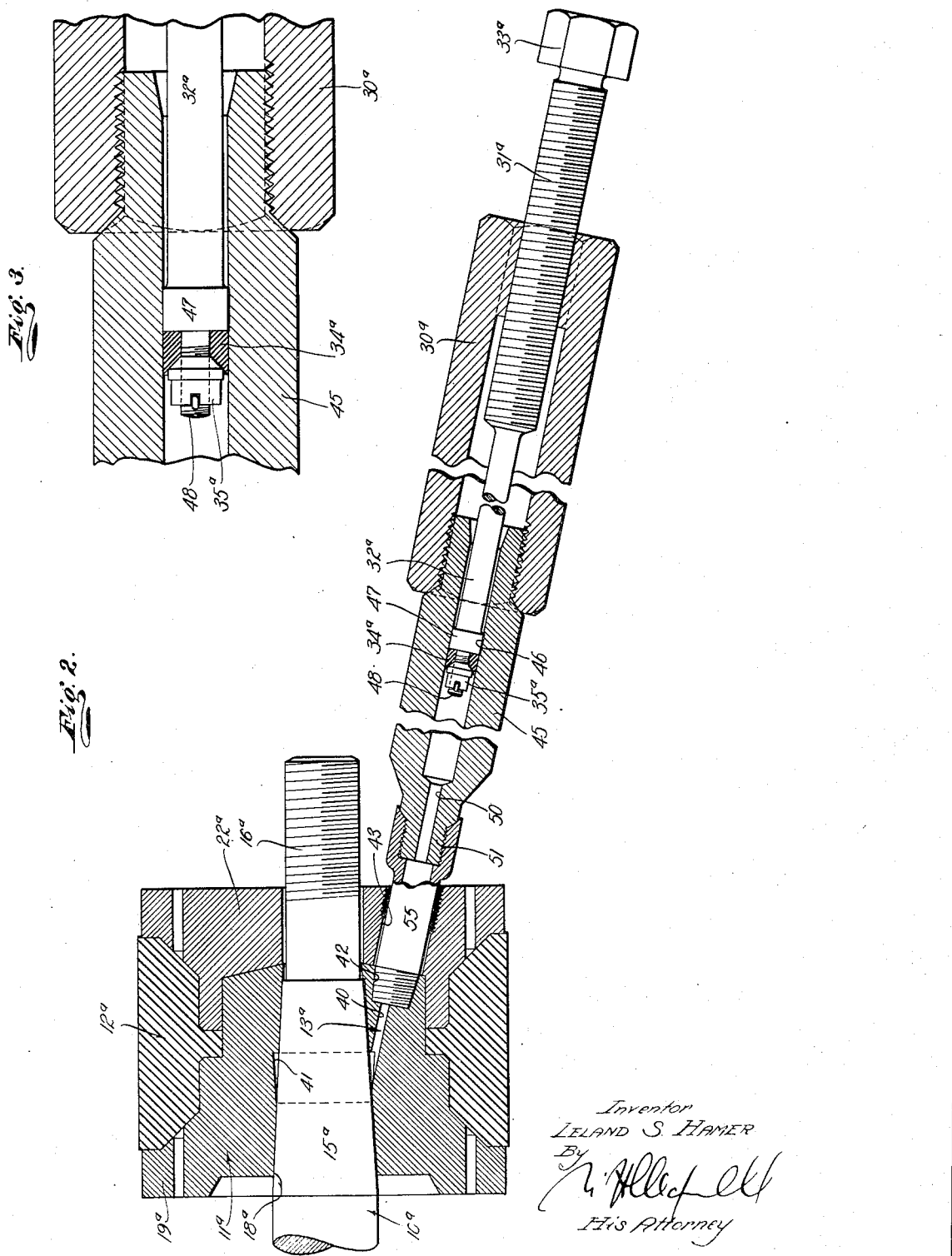

Patented June 22, 1937

2,084,439

UNITED STATES PATENT OFFICE 2,084,439

PISTON AND PISTON ROD ASSEMBLY

Leland S. Hamer, Long Beach, Calif.

Application March 10, 1934, Serial No. 715,031

2 Claims. (Cl. 287—53)

This invention relates to pistons and piston rods and relates more particularly to a piston and piston rod assembly. A general object of this invention is to provide a simple, practical and effective piston and piston rod assembly in which the piston may be easily and quickly removed from the piston rod.

The pistons of pumps and other mechanisms often become so tightly set on the piston rods that it is extremely difficult to remove them. It is the common practice in various classes of mechanisms to provide the piston rod with a tapering portion and to taper the rod receiving opening of the piston. In such cases the piston retaining nut urges the piston onto the tapered rod and where the fluid is handled at high pressures the piston becomes more tightly forced or wedged on the rod through its action on the fluid. In many instances a piston becomes so tightly wedged or forced on the piston rod that it must be broken to free it from the rod.

Another object of the invention is to provide a piston and piston rod assembly formed and provided with means whereby the piston may be easily and quickly removed from the rod.

Another object of the invention is to provide a piston and piston rod assembly in which the piston is normally firmly and dependably retained on the rod but may be readily removed from the rod without striking, jarring, heating or applying external force to the assembly.

Another object of the invention is to provide a piston and piston rod assembly adapted to be disconnected by fluid under pressure acting between the contacting portions of the assembly.

A further object of the invention is to provide an assembly of the character mentioned in which the rod or piston has a port for carrying fluid pressure to a confined space between the contacting parts for freeing the piston from the rod.

A still further object of the invention is to provide a piston and piston rod assembly of the character mentioned that is simple and inexpensive of manufacture.

Other objects and features of the invention will be better and more fully understood from the following detailed description of typical forms and applications of the invention, throughout which description reference may be had to the accompanying drawings, in which:

Fig. 1 is a longitudinal detailed sectional view of one form of the invention illustrating one type of pressure developing means in operative position on the piston rod. Fig. 2 is a longitudinal detailed sectional view of another form of the invention showing another type of pressure developing means, and Fig. 3 is an enlarged fragmentary detailed sectional view of a portion of the pressure developing device illustrated in Fig. 2.

The present invention is adapted to be embodied in piston and piston rod assemblies for use in various classes and forms of mechanisms and in assemblies where the piston involves various types of sealing means and other features. Throughout the following detailed disclosures I will describe the invention embodied in typical forms including a piston of a general type employed in slush pumps, and the like. It is to be understood that the invention is not to be construed as limited or restricted to the specific forms or applications about to be described but is to be taken as including any features or modifications that may fall within the scope of the claims.

The embodiment of the invention illustrated in Fig. 1 includes, generally, a rod 10, a piston hub or body 11 on the rod 10, a member 12 of resilient material on the body 11 for slidably sealing with the wall of a cylinder and means 13 in the rod 10 for supplying or conducting fluid pressure for freeing the body 11 from the rod 10.

The piston rod 10 may resemble, generally, the piston rods employed in the various cylinder and piston mechanisms. The main portion 14 of the rod 10 may be cylindrical, as illustrated. The portion 15 of the rod 10 for receiving or carrying the body 11 of the piston is longitudinally tapered and of round cross section. The end portion 16 of the piston rod has a comparatively long screw thread 17 for receiving the usual piston retaining nut and lock nut (not shown). The threaded end portion 16 projects axially beyond the end of the piston.

The hub or body 11 of the piston may be a simple integral member and is provided with a central longitudinal opening 18 for receiving the piston rod 10. The opening 18 is longitudinally tapered and the body 11 is normally arranged or set on the rod so that the walls of the opening 18 tightly and evenly bear on the surface of the tapered portion 15 of the rod. The tapered rod portion 15 and the wall of the opening 18 are preferably accurately finished to have close effective cooperation. The hub or body 11 of the piston carries the member 12 and its construction and shape depend upon the shape and character of the cylinder engaging means embodied in the piston. In the particular case illustrated in the drawings the body 11 has a radial annular end flange 19 provided with a tapered or inclined inner side 20. The opposite end portion 21 of the body 11 is shown as being of reduced diameter.

The member 12 is provided to slidably seal with the wall of the cylinder and is constructed of rubber or a suitable rubber composition. The sealing member 12 is tubular or annular in its general configuration and surrounds the body 11 in a position where one end bears against the inclined side 20 of the body flange. The piston includes and end plate or follower 22 freely surrounding the rod 10 and having a socket 23 receiving the reduced end portion 21 of the body 11. The follower 22 has an inclined inner side 24 for bearing against the end of the member 12. Ports 25 are provided in the flange 19 and follower 22 to permit the fluid pressure in the cylinder to act against the opposite ends of the resilient sealing member 12. The member 12 extends outwardly beyond the flange 19 and follower 22 to have its periphery slidably cooperate with the wall of the cylinder.

The means 13 is provided to conduct fluid pressure to a space between the contacting tapered surfaces of the rod 10 and body 11 to free or disengage the body 11 from the rod. In accordance with the form of the invention being described the means 13 provides or includes a longitudinal opening 26 in the piston rod 10. The opening 26 extends inwardly from the end of the rod and may terminate at a point within the tapered portion 15 of the rod. The opening 26 may be uniform in diameter and its wall is accurately ground or finished. A threaded socket 27 is provided in the outer end of the opening 26 for normally receiving a plug and for facilitating the connection of a fluid pressure supplying means with the rod 10 as will be hereinafter described. One or more ports 28 are provided in the rod 10 to connect the opening 26 with the pressure space between the rod and piston body 11.

In the particular form of the invention being described the confined pressure space is in the nature of a groove 29 in the surface of the tapered portion 15 of the piston rod. The groove 29 is preferably annular to surround the rod 10 and is spaced between the opposite ends of the piston body 11. In accordance with the broader aspects of the invention the space or groove 29 may be of any desired cross sectional configuration. The space or groove 29 is provided to receive fluid pressure for freeing or disconnecting the piston body 11 from the rod 10. Fluid pressure is passed to the space or groove 29 from the opening 26 through the ports 28 and upon the pressure reaching a certain value it acts outwardly on the piston body 11 and inwardly on the rod 10 to suddenly release the piston body 11 from the rod.

Fig. 1 illustrates one form of apparatus described and claimed in my co-pending application referred to above for supplying fluid pressure to the space or groove 299. This pressure developing means or apparatus includes a tubular body member 30 adapted to be threaded on the projecting end portion 16 of the piston rod 10. A screw 31 is threaded into the member 30 and carries a plunger 32 which operates in the opening 26 of the piston rod. The outer end of the screw 31 is provided with a suitable polygonal head 33 for engagement by a wrench or turning tool. The inner end of the plunger 32 carries a cup leather or plunger cup 34 for slidably sealing with the wall of the opening 26. A nut 35 is removably keyed on a reduced end part of the plunger to retain the plunger cup 34 in its operative position on the plunger. The screw 31 is adapted to be threaded inwardly in the member 30 to operate the plunger 32 in the opening 26 to develop fluid pressure in the opening and the groove 29 for disconnecting the piston body 11 from the rod 10.

The groove 29 and the opening 26 are provided with a suitable fluid such as grease. This fluid may be supplied to the groove and opening when the piston is assembled on the rod 10 and may be retained therein by the plug threaded in the socket 27. When it is desired to remove the piston from the rod 10 the lock nut and the piston retaining nut are threaded from the projecting portion 16 of the rod. The fluid retaining plug is also removed from the socket 27. The member 30 of the pressure developing apparatus is then threaded on the rod and the plunger 32 is started in the opening 26. The screw 31 is then engaged and turned to operate the plunger 32 inwardly against the grease or fluid in the opening 26. This operates to put the fluid in the groove 29 under pressure. When the fluid is put under a sufficiently high pressure the body 11 of the piston is suddenly freed from the piston rod 10. The space or groove 29 is sealed by the wedged or closely contacting surfaces of the piston rod and piston body 11 and the fluid under high pressure in the groove 29 exerts an expanding force on the piston body and a contracting force on the piston rod. These forces suddenly overcome the binding or wedging contact of the surfaces of the piston body and rod causing the piston body to free itself from the rod. After the piston body 11 has been freed or disconnected from the rod in the manner just described the screw 31 is threaded outwardly to relieve the pressure in the groove 29 and the member 30 is unthreaded from the rod. The piston may then be easily removed from the rod.

Fig. 2 of the drawings illustrates an embodiment of the invention in which the means 13ª for supplying or conducting fluid pressure to the space between the piston body 11ª and the piston rod 10ª is provided in the piston body 11ª. The piston and piston rod illustrated in Fig. 2 are substantially identical with the piston and rod described above, it being understood that the invention as disclosed in Fig. 2 may be embodied in pistons varying considerably in character. The piston rod 10ª has a longitudinally tapered portion 15ª and a threaded end portion 16ª for the reception of the piston retaining nut and lock nut (not shown). A resilient annular member 12ª surrounds the piston body 11ª and is provided for slidably sealing with the wall of the cylinder. An end plate or follower 22ª clamps the sealing member 12ª against a flange 19ª on the piston body 11ª. The piston body 11ª has a central longitudinal opening 18ª which is longitudinally tapered to tightly receive the tapered portion 15ª of the piston rod.

The means 13ª is provided to conduct fluid pressure to a space between the contacting portions of the piston rod and piston body for the purpose of freeing or disconnecting the piston body from the rod. The means 13ª includes a port 40 in the piston body 11ª extending to the space between the contacting portions of the piston body and rod 10ª. In the form of the invention disclosed in Fig. 2 the pressure space between the contacting parts of the piston body and piston rod is in the form of a groove 41 in the wall of the opening 18ª. The groove 41 is preferably continuous or annular to surround the tapered portion 15ª of the piston rod. The groove 41 is spaced between the ends of the piston body 11ª and may be of any suitable shape. In the particular case illustrated the groove 41 is substantially triangular in cross-sectional configuration having an outer wall pitched in the opposite direction to the wall of the opening 18ª and a substantially normal end wall. The port 40 extends from the groove 41 to the reduced outer end of the body 11ª.

Means is provided at the outer end of the port 40 for facilitating the connection of a pressure developing or supplying means with the piston body. A screw-threaded socket 42 is provided in the outer end of the port 40. An opening 43 is provided in the follower 22ª to register with the socket 42. The outer portion of the opening 43 may be threaded for normally receiving a plug (not shown). The socket 42 may normally carry a plug for closing the outer end of the port 40 to retain a suitable fluid in the port and groove 41. When the plugs are removed from the socket 42 and the opening 43 fluid pressure may be supplied to the port 40 and groove 41 for the purpose of freeing or disconnecting the piston body 11ª from the rod 10ª.

Figs. 2 and 3 of the drawings illustrate another form of pressure supplying or developing means for use in connection with the piston and piston rod assembly of the invention. The pressure supplying or developing means disclosed in Figs. 2 and 3 is fully described and claimed in my co-pending application referred to above. The device or apparatus for supplying fluid pressure to the port 40 includes a body member 30ª which may be identical with the member 30 and a screw 31ª threaded into the member 30ª. The screw 31ª projects from the end of the member 30ª and carries a polygonal head 33ª. A tubular member or cylinder 45 is screw threaded into the inner end of the member 30ª and its opening 46 receives a plunger 32ª carried by the screw 31ª. The plunger 32ª has a head 47 slidably fitting the opening 46 and has a reduced portion 48 extending beyond the head. A cup leather or plunger cup 34ª surrounds the portion 48 and is clamped against the head 47 by a keyed nut 35ª. A reduced passage 50 extends from the outer end of the opening 46 to the end of the cylinder 45. The cylinder 45 is provided on its end with a reduced portion or pin 51 threaded into the socket of an adapter 55. The adapter 55 is adapted to be passed through the opening 43 and its end is adapted to be threaded into the socket 42 of the piston body 11ª.

To remove the piston from the rod 10ª the usual nut and lock nut are removed from the threaded end 16ª of the rod. The plugs (not shown) are removed from the socket 42 and the opening 43 and the adapter 55 is threaded into the socket. The groove 41 and the port 40 are preferably supplied with grease or the like when the piston is assembled on the rod and a similar fluid is provided in the cylinder opening 46. Inward movement of the plunger 32ª places the fluid in the space or groove 41 under a high pressure. When the pressure in the space 41 becomes sufficiently great the piston body 11ª is suddenly sprung and shifted free of the piston rod 10ª so that the piston may be easily removed from the rod. It will be apparent how the fluid under high pressure in the space or groove 41 acts outwardly against the piston body and inwardly against the rod 10ª to release the piston body from the rod. The pressure developing device or apparatus illustrated in Figs. 2 and 3 of the drawings is suitable for use in removing the piston body 11 from the rod 10 as its pin 51 is adapted to be threaded into the opening 27 so that fluid pressure may be supplied from the opening 46 to the opening 26 and groove 29.

The present invention provides piston and piston rod assemblies that are adapted to be easily and quickly disconnected by the operation of internal fluid pressures. The means for supplying or delivering the fluid pressure to the space between the contacting parts of the piston body and rod does not greatly complicate the construction and may be embodied in piston and piston rod assemblies varying considerably in character. The invention is suited for embodiment in piston and piston rod assemblies employed in mechanisms handling fluid at high pressures, because it provides a means for easily and readily removing the pistons from the rods in cases where the pistons have become tightly wedged or set on the rods.

Having described only typical preferred forms and applications of my invention, I do not wish to be limited or restricted to the specific forms and applications herein set forth, but wish to reserve to myself any modifications or variations that may appear to those skilled in the art or fall within the scope of the following claims.

Having described my invention, I claim:

1. In combination, two parts, one a rod having a tapered portion, the other a piston having a tapered opening receiving the tapered portion of the rod, there being an annular space between the contacting parts surrounding the rod, one of the parts having an opening extending to said space to conduct fluid pressure thereto, a member removably threaded on said part, and a plunger threaded in the member and operable in the opening to create pressure in the space to disconnect the parts.

2. In combination, two parts, one a rod having a tapered portion, the other a piston having a tapered opening receiving the tapered portion of the rod, there being an annular space between the contacting parts surrounding the rod, one of the parts having an opening extending to said space to conduct fluid pressure thereto, a member removably threaded on the rod, and a plunger threaded through the member to operate in the opening and create pressure in the space to disconnect the parts.

LELAND S. HAMER.